Nov. 23, 1948.   DE GASPE BEAUBIEN   2,454,370
ELECTRONIC BAKING OVEN
Filed June 25, 1946   2 Sheets-Sheet 2
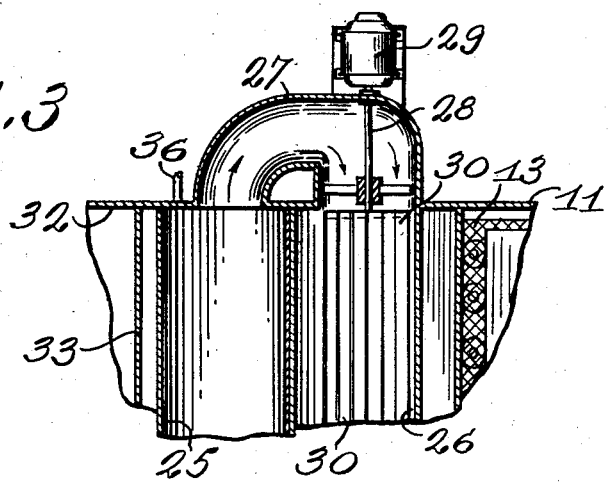
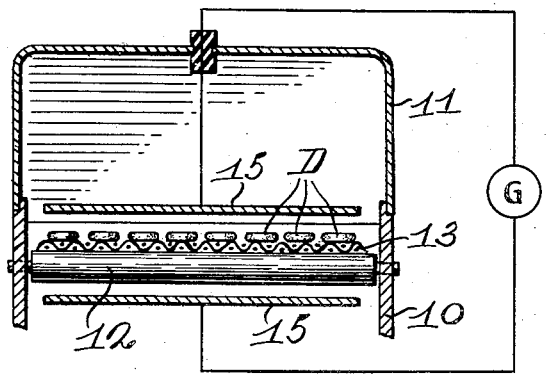
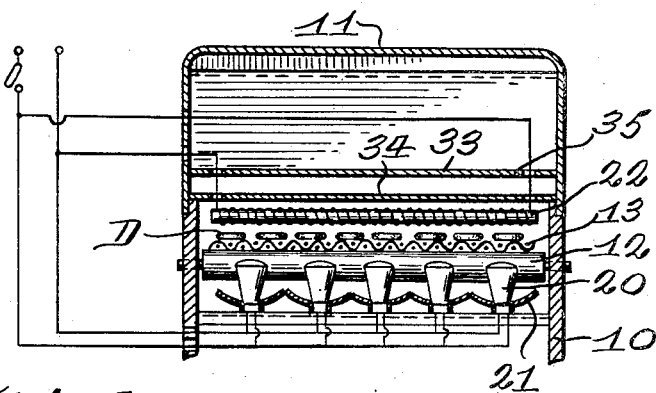
Inventor
De Gaspé Beaubien
By Robic & Bastien
Attorneys Patented Nov. 23, 1948

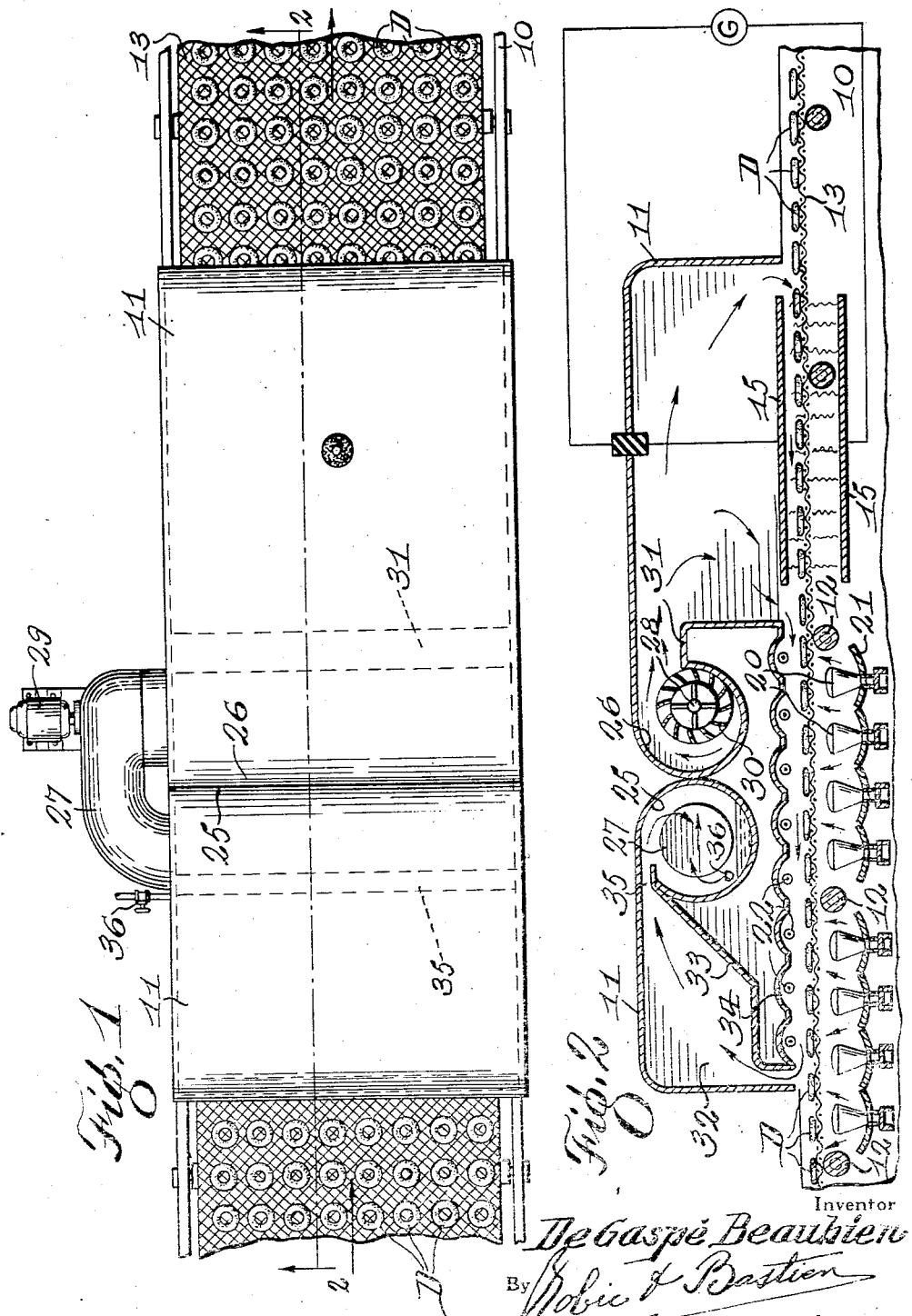

2,454,370

UNITED STATES PATENT OFFICE 2,454,370

ELECTRONIC BAKING OVEN de Gaspe Beaubien, Outremont, near Montreal, Quebec, Canada Application June 25, 1946, Serial No. 679,144

1 Claim. (Cl. 219—35)

The present invention relates to food baking means and, more particularly, electronically heated baking devices.

The use of high-frequency fields for inducing heat in dielectric materials has been suggested and applied before. For cooking, or baking, dough and similar plastic substances, however, difficulty has been experienced due, probably, to the vaporizing of water or other volatile solvents causing deformation, cracking or blistering of the substances treated.

For the rapid continuous baking of biscuits, and other preformed plastic masses, it is clear that this method of dielectric heating cannot be used if a presentable finished article is required.

The present invention has been conceived to avoid the disadvantages noted above and still retain the distinct features of dielectric heating. In accordance with the invention, baking is first commenced under the influence of radiant heat, such as infra-red rays, electric strip heaters, gas or even oil burners. This preliminary cooking dries the dough from the outside first and provides an outer porous crust through which the vapours of the inner plastic core can pass without blisters and cracking. The dielectric heating can then be applied, and the inside of the object to be baked rapidly cooked without difficulty, the result being a perfectly baked and crusted object in the case of biscuits and like bakery products.

The primary object of the invention resides in the provision of a baking machine of improved performance.

An additional important object is the provision of a baking oven of the so-called band type in which the overall operating temperature is greatly reduced throughout the oven, or at least in a substantial portion thereof.

Still an additional object provides for a band oven of the character described which is calculated to bake objects in a rapid and economical manner.

Another object contemplates a continuous electronically heated baking machine having improved humidity disposal.

A further object concerns a device of the character described which is odourless and free from objectionable vapours or steaming.

Still another object envisages baking means which are compact, relatively inexpensive and of easy maintenance.

Other objects and advantages will become apparent, or be pointed out further, during the description to follow.

As an example, and for purposes of illustration only, an embodiment of the invention is shown in the annexed drawings, wherein:

Figure 1 is a plan view of the machine according to the invention;

Figure 2 is a vertical longitudinal section therethrough;

Figure 3 is a horizontal section taken partly through the air blowing means;

Figure 4 is a vertical transverse section through the dielectric heating part of the machine, and Figure 5 is a similar view through the infra-red and strip heating part.

Referring to the drawings, wherein similar reference characters represent corresponding parts throughout, the reference numeral 10 indicates generally the frame of the machine, over which a cover 11 is adapted to fit.

The frame supports a plurality of idler rollers 12 over which an endless band, foraminous or not 13 is movable by suitable means. Said band is adapted to receive the objects to be baked, in the present instance doughnuts, biscuits or the like D which consists of a batter, or dough, containing water and from which, accordingly, of humidity will be extracted during baking or cooking.

The band travelling from left to right, the first baking stage is intended to be done by radiant heating, by means of infra-red lamps 20, having reflectors 21, and electric strip heaters 22 disposed below and above the band, respectively. The heat rays from said heating means start the baking operation and may even impart a superficial brown colour to the objects being treated. Said objects continue their travel to the right of the machine where they are further baked by dielectric heating.

This is effectuated between the condenser plates, or electrodes 15 connected in any suitable manner to a high-frequency generator G. Although one set only of said plates is shown, it is obvious that several, or only one plate cooperating with the frame, may be used for extended cooking, or where conditions demand.

In accordance with the known effects of a high-frequency electric field, the objects on the band will be heated throughout and rapidly baked; due to this method of heating, however, the colour of the baked object will be uniform and, in biscuits and other articles of food, the absence of a darker crust is an objectionable feature, requiring a "crusting" stage before, or after, the dielectric heating.

The water evaporated during cooking of bakery products, presents a removal problem with which the present invention is particularly concerned. For that purpose a ventilating and water-condensing arrangement is disposed in the cover 11 as shown in Figures 1, 2 and 3.

Intermediately formed between the ends of the said cover, at the top thereof, are parallel cylindrical inlet and exhaust ducts 25 and 26 respectively, extending across the cover substantially above the left infra-red ray part of the baking machine. Both ducts are connected together at one end by an elbow 27, through which a shaft 28 driven by motor 29 extends, and closed at the other end.

A turbo-blower rotor 30 is mounted on the shaft 28, to extend the full distance of the duct 26, arranged to draw air from the elbow and discharge the same under pressure into a channel 31 formed longitudinally at the top side of the duct. This channel opens inside the right portion of the cover 11, whereby a current of air is circulated over the objects D being baked.

The air charged with the vapours from said objects is carried to the left, over the entire length of the band, by the suction created in duct 25 by the blower, into the chamber 32. Said chamber is formed by the baffle 33 extending, from the roof 34, over the strip heaters to the upper side of the duct 25, where it terminates close to the cover 11 to provide a restricted passage 35 communicating with the inside of said duct.

As a consequence of this arrangement, there is a small vacuum created in the inlet duct 25 causing an expansion of the hot and water-charged air drawn from the area adjacent the band. This expansion has for an effect to cool the air issuing from passage 35, the result being a condensation of the vapours into water which collects on the side and bottom of the duct, this action being assisted by centrifugal force urging the heavier particles against the wall of said duct. A drain 36 may be provided to evacuate said water periodically.

The dehumidified air is then pumped by the blower, under pressure, back over the band to dry the objects being baked, this cycle being endlessly repeated during operation of the machine.

From the foregoing, it should be evident that the present invention is an advance in the art of baking devices: the mechanism described is efficient to accelerate the baking by carrying away the vapours that, otherwise would saturate the atmosphere surrounding the objects being treated. Consequently, there is very little escape of fumes, or vapours, and the apparatus can be used almost anywhere without special ventilating means. Furthermore, in the case of solvent-impregnated objects, the recovery of the said solvent as a liquid might be a decided factor of economy. Besides, the baking atmosphere being kept uniform, the operating efficiency of the apparatus can be maintained high and its output adjusted more closely to obtain standardized products.

It must be understood that various changes as to the shape, size and arrangement of parts can be resorted to without departing from the spirit of the invention, or the scope of the subjoined claim.

Having thus described my invention, I claim:

An apparatus for baking objects of food comprising, in combination, radiant-field heating means for removing moisture from said objects and toasting same, high-frequency dielectric-field heating means for baking said objects, an endless band movable successively into the fields of said heating means and adapted to carry said objects, a cover enclosing the band and heating means, transverse outlet and inlet ducts formed in parallel relation in said cover and communicable with the radiant field and dielectric field, respectively, an elbow connecting said ducts at the extremities opposite said fields, a blower in one of said ducts for circulating air in the ducts and fields, and said outlet duct having a restricted communication with the radiant field whereby air entering the duct therefrom is caused to expand, the temperature decreasing and some of the vaporized moisture condensing thereby.

DE GASPE BEAUBIEN.

REFERENCES CITED

The following references are of record in the file of this patent:

UNITED STATES PATENTS

| Number | Name | Date |
| --- | --- | --- |
| 1,585,437 | Talbutt | May 18, 1926 |
| 2,042,145 | Darrah | May 26, 1936 |
| 2,231,457 | Stephen | Feb. 11, 1941 |
| 2,264,611 | Bemis | Dec. 2, 1941 |
| 2,340,354 | Wells | Feb. 1, 1944 |
| 2,413,003 | Sherman | Dec. 24, 1946 |